United States Patent
Zhang et al.

(10) Patent No.: US 11,018,604 B2
(45) Date of Patent: May 25, 2021

(54) CONVERSION CIRCUIT BOARD OF BRUSHLESS DIRECT CURRENT (BLDC) MOTOR AND PACKAGED TERMINAL AIR CONDITIONER (PTAC) COMPRISING THE SAME

(71) Applicant: Zhongshan Broad-Ocean Motor Co., Ltd., Zhongshan (CN)

(72) Inventors: Xiansheng Zhang, Zhongshan (CN); Yong Zhao, Zhongshan (CN); Meishuang Chen, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 95 days.

(21) Appl. No.: 16/503,620

(22) Filed: Jul. 4, 2019

(65) Prior Publication Data

US 2019/0341864 A1  Nov. 7, 2019

Related U.S. Application Data

(63) Continuation-in-part of application No. PCT/CN2018/103754, filed on Sep. 3, 2018.

(30) Foreign Application Priority Data

Apr. 17, 2018  (CN) .......................... 201810345408.0
Apr. 17, 2018  (CN) .......................... 201820546260.2

(51) Int. Cl.
  *H02P 6/08*  (2016.01)
  *H02M 1/32*  (2007.01)
  (Continued)

(52) U.S. Cl.
  CPC ................ *H02P 6/08* (2013.01); *H02M 1/32* (2013.01); *H02M 1/44* (2013.01); *H02M 3/156* (2013.01);
  (Continued)

(58) Field of Classification Search
  CPC .... H02P 6/08; H02P 27/08; H02P 6/04; H02P 25/03; H02P 2006/045; H02M 1/32; H02M 1/44; H02M 3/156; H02M 7/12
  See application file for complete search history.

(56) References Cited

U.S. PATENT DOCUMENTS

4,048,530 A * 9/1977 Kaufman, Jr. ........... H02K 5/04
                                                310/89
4,503,940 A * 3/1985 Watanabe ................. H02P 3/18
                                                187/290
(Continued)

FOREIGN PATENT DOCUMENTS

CN     204615699 U    9/2015
CN     105811815 A    7/2016
(Continued)

*Primary Examiner* — Thai T Dinh
(74) *Attorney, Agent, or Firm* — Matthias Scholl P.C.; Matthias Scholl

(57) ABSTRACT

A conversion circuit board, including: a microprocessor module; a power module; a communication module; a first interface module; and a second interface module. The microprocessor module is adapted to communicate with a motherboard of an air conditioner via the communication module. The microprocessor module is adapted to connect to a first brushless direct current motor and a second brushless direct current motor via the first interface module and the second interface module, respectively. The power module supplies powers for the microprocessor module, the communication module, the first interface module, and the second interface module.

12 Claims, 17 Drawing Sheets

(51) Int. Cl.
  *H02M 1/44* (2007.01)
  *H02M 3/156* (2006.01)
  *H02P 6/04* (2016.01)
  *H02M 7/12* (2006.01)

(52) U.S. Cl.
  CPC ............... *H02M 7/12* (2013.01); *H02P 6/04* (2013.01); *H02P 2006/045* (2013.01)

(56) References Cited

U.S. PATENT DOCUMENTS

| | | | | |
|---|---|---|---|---|
| 5,803,043 | A * | 9/1998 | Bayron | F02P 11/04 |
| | | | | 123/335 |
| 6,809,484 | B2 * | 10/2004 | Makaran | H02P 6/04 |
| | | | | 318/34 |
| 7,950,464 | B2 * | 5/2011 | Atencio | G05B 15/02 |
| | | | | 166/360 |
| 8,164,293 | B2 * | 4/2012 | Flanary | H02P 1/029 |
| | | | | 318/471 |
| 8,934,258 | B2 * | 1/2015 | Zhao | H02P 25/16 |
| | | | | 361/764 |
| 9,088,242 | B2 * | 7/2015 | Zhao | H02P 6/08 |
| 2013/0241455 | A1 * | 9/2013 | Lu | H02P 25/04 |
| | | | | 318/400.37 |
| 2014/0320052 | A1 * | 10/2014 | Zhao | H02P 27/06 |
| | | | | 318/400.32 |
| 2016/0043632 | A1 * | 2/2016 | Tomioka | H02M 1/4225 |
| | | | | 323/210 |

FOREIGN PATENT DOCUMENTS

| | | |
|---|---|---|
| CN | 106936342 A | 7/2017 |
| CN | 107732873 A | 2/2018 |
| CN | 108288929 A | 7/2018 |

\* cited by examiner

CONVERSION CIRCUIT BOARD OF BRUSHLESS DIRECT CURRENT (BLDC) MOTOR AND PACKAGED TERMINAL AIR CONDITIONER (PTAC) COMPRISING THE SAME

CROSS-REFERENCE TO RELATED APPLICATIONS

This application is a continuation-in-part of International Patent Application No. PCT/CN2018/103754 with an international filing date of Sep. 3, 2018, designating the United States, and further claims foreign priority benefits to Chinese Patent Application No. 201810345408.0 filed Apr. 17, 2018, and to Chinese Patent Application No. 201820546260.2 filed Apr. 17, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to a conversion circuit board of a brushless direct current (BLDC) motor and a packaged terminal air conditioner (PTAC) comprising the same.

Conventionally, as shown in FIG. 1, the motherboard of the packaged terminal air conditioner is directly connected to a BLDC motor. This leads to a relatively low operational efficiency and to a high production cost.

SUMMARY

Disclosed is a conversion circuit board of a brushless direct current motor. The motherboard of a packaged terminal air conditioner can be connected to two or more BLDC motors via the conversion circuit board, thus improving the operational efficiency.

The disclosure provides a conversion circuit board, comprising: a microprocessor module; a power module; a communication module; a first interface module; and a second interface module. The microprocessor module is adapted to communicate with a motherboard of an air conditioner via the communication module; the microprocessor module is adapted to connect to a first brushless direct current motor and a second brushless direct current motor via the first interface module and the second interface module, respectively; and the power module supplies powers for the microprocessor module, the communication module, the first interface module, and the second interface module.

The power module can comprise a surge current suppression circuit, an electromagnetic interference (EMI) circuit, a rectifier circuit, and a DC-DC converter circuit; an input end of the surge current suppression circuit can be connected to an AC input; the surge current suppression circuit, the EMI circuit, the rectifier circuit and the DC-DC converter circuit are connected sequentially; an output end of the rectifier circuit outputs a DC bus voltage; and an output end of the DC-DC converter circuit outputs a plurality of isolated independent power supplies.

The rectifier circuit can be a rectifier comprising a voltage doubling circuit which is adapted to double the DC bus voltage.

The first interface module and the second interface module each comprise five signals: a DC bus voltage, a grounding signal, a driving voltage of an insulated-gate bipolar transistor (IGBT), a speed command signal, and a speed feedback signal.

The communication module can be a serial communication module.

The speed feedback signal can be a pulse signal; the microprocessor module is adapted to convert a pulse number of the speed feedback signal into a real-time rotational speed of the first and/or second brushless direct current motor.

The speed command signal can be a pulse-width modulation (PWM) signal.

The communication module can be a RS485 serial communication module.

Also provided is a packaged terminal air conditioner, comprising a motherboard, the aforesaid conversion circuit board, a first brushless direct current motor, and a second brushless direct current motor. The microprocessor module communicates with the motherboard via the communication module; the microprocessor module is connected to the first brushless direct current motor and the second brushless direct current motor via the first interface module and the second interface module, respectively; the microprocessor module is adapted to convert a rotational speed command of the motherboard into a speed command signal of the first and/or the second brushless direct current motor; and the microprocessor module is adapted to convert and transmit a speed feedback signal of the first and/or the second brushless direct current motor to the motherboard.

The first brushless direct current motor and the second brushless direct current motor each can comprise a motor body equipped with a drive circuit board; the motor body can comprise a stator assembly, a rotor assembly, a rotary shaft and a bearing; the drive circuit board can comprise a built-in interface circuit, a motor microprocessor, a detection circuit of motor operation parameters, and an IGBT inverter circuit; the detection circuit is adapted to transmit detected motor operation parameters to the motor microprocessor, the motor microprocessor outputs a control signal to the IGBT inverter circuit, and the IGBT inverter circuit controls the power on or off of the stator assembly.

The first brushless direct current motor and the second brushless direct current motor are a plastic encapsulated motor and each can further comprise a front bearing support and a rear bearing support; the stator assembly can be a plastic encapsulated stator assembly comprising a stator core, an end insulator, a coil winding and a plastic package; the stator core, the end insulator, and the coil winding are integrated with the plastic package; the front bearing support and the rear bearing support are disposed at two ends of the plastic encapsulated stator assembly, respectively; two bearings are provided and disposed on the front bearing support and the rear bearing support, respectively; the rotary shaft can be supported by the two bearings; and the rotor assembly can be connected to the rotary shaft.

The detection circuit of motor operation parameters is adapted to detect a rotor position signal or a phase current signal of the coil winding or a bus current signal and a bus voltage signal.

The conversion circuit board can comprise a four-pin full duplex communication interface, two pins of which can be connected to the communication module, and the other two pins can be connected to a grounding signal and a supply voltage of the microprocessor module, respectively.

The conversion circuit board can comprise two standard 6-pin communication interfaces; 5 pins of one standard 6-pin communication interface can respectively be connected to a DC bus voltage, grounding signal, a driving voltage of an insulated-gate bipolar transistor (IGBT), a first speed command signal, and a first speed feedback signal, and one pin is stand-by; 5 pins of the other standard 6-pin communication interface can respectively be connected to the DC bus voltage, the grounding signal, the driving voltage of the insulated-gate bipolar transistor (IGBT), a second speed command signal, and a second speed feedback signal, and one pin is stand-by.

Advantages of the conversion circuit board of a brushless direct current motor as described in the disclosure are summarized as follows.

1. The conversion circuit board is an integrated structure and cost-effective.

2. The output end of the DC-DC converter circuit outputs a plurality of isolated independent power supplies for each circuit unit, ensuring the stable power supply.

3. One PTAC motherboard can drive two or more BLDC motors via the conversion circuit board. This reduces the operation cost and improves the operation efficiency.

4. Conventional interface modules can be applied to the conversion circuit board and the packaged terminal air conditioner. This facilitates the connection and assembly of the packaged terminal air conditioner.

DETAILED DESCRIPTION

To further illustrate, embodiments detailing a conversion circuit board of a brushless direct current (BLDC) motor are described below. It should be noted that the following embodiments are intended to describe and not to limit the disclosure.

Figure 1:
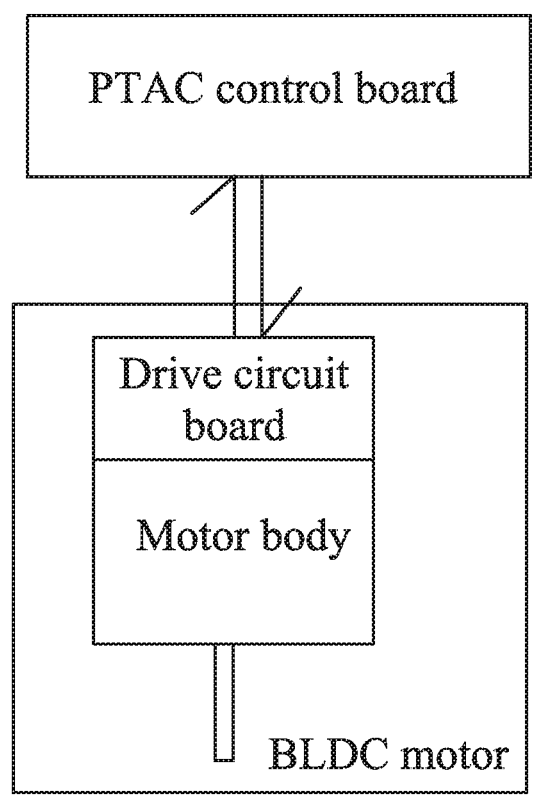
FIG. 1 is schematic diagram of a control unit of a packaged terminal air conditioner (PTAC) in the related art.
Figure 2:
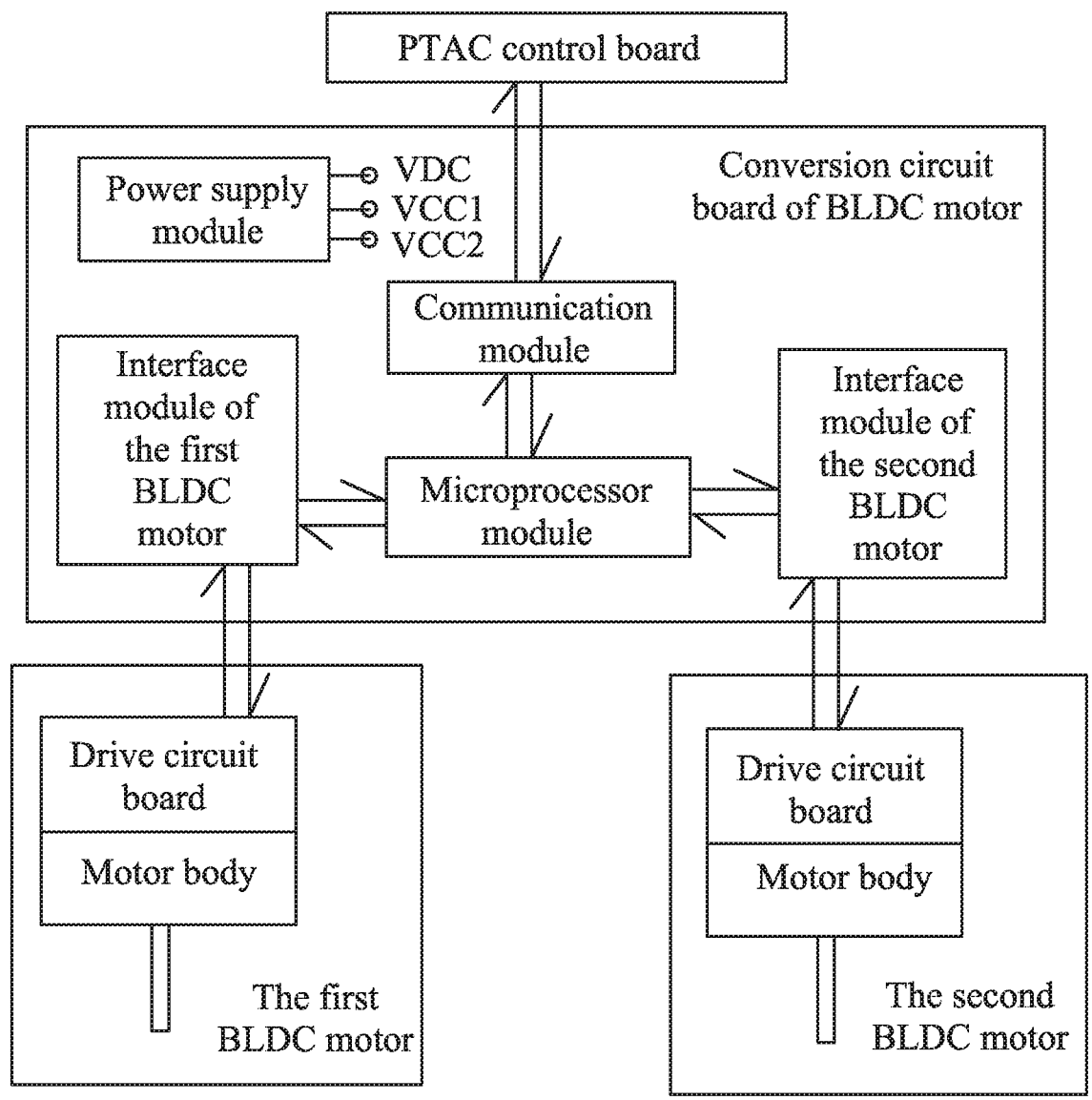
FIG. 2 is schematic diagram of a packaged terminal air conditioner (PTAC) in accordance to one embodiment of the disclosure.

As shown in FIG. 2, provided is a packaged terminal air conditioner (PTAC) comprising a PTAC motherboard, a conversion circuit board, a first brushless direct current motor, and a second brushless direct current motor. The first brushless direct current motor and the second brushless direct current motor are employed to drive a blower. The microprocessor module communicates with the PTAC motherboard via a communication module.

The conversion circuit board comprises a microprocessor module; a power module; a communication module; a first interface module; and a second interface module. The microprocessor module communicates with a motherboard of an air conditioner via the communication module. The microprocessor module is connected to a first brushless direct current motor and a second brushless direct current motor via the first interface module and the second interface module, respectively.

The microprocessor module of the conversion circuit board is adapted to convert the control command transmitted from the PTAC motherboard to the first and/or second brushless direct current motor.

Figure 3:
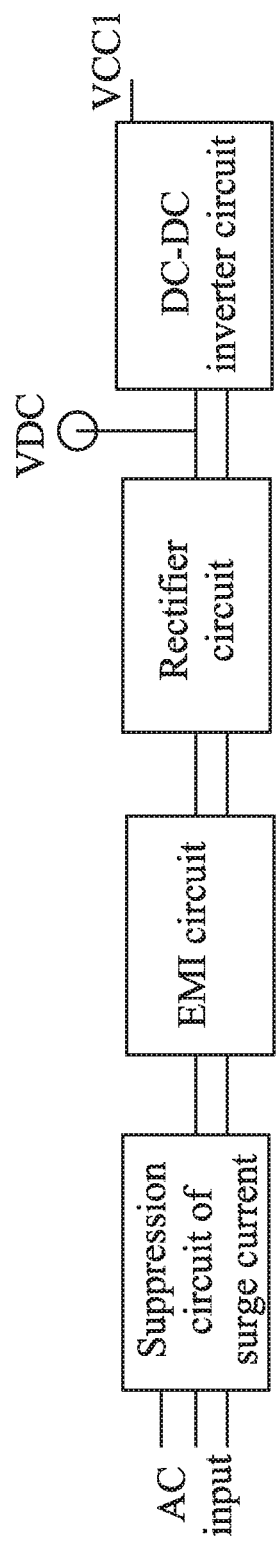
FIG. 3 is a block diagram of a power module of a conversion circuit board in accordance to one embodiment of the disclosure.
Figure 4:
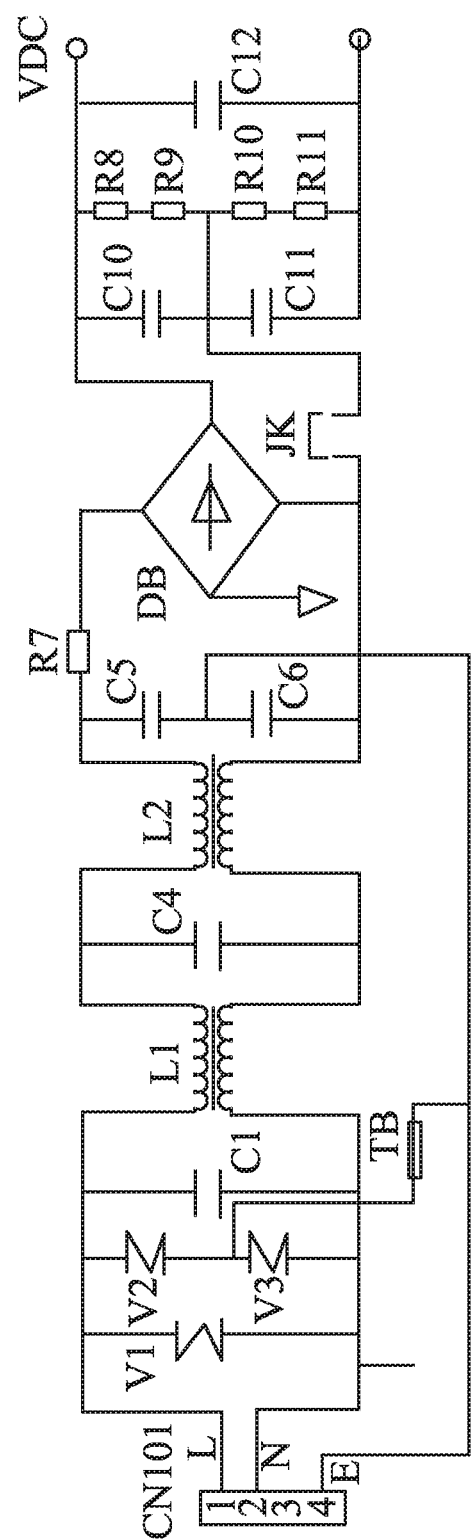
FIG. 4 is a circuit diagram corresponding to FIG. 3.
Figure 5:
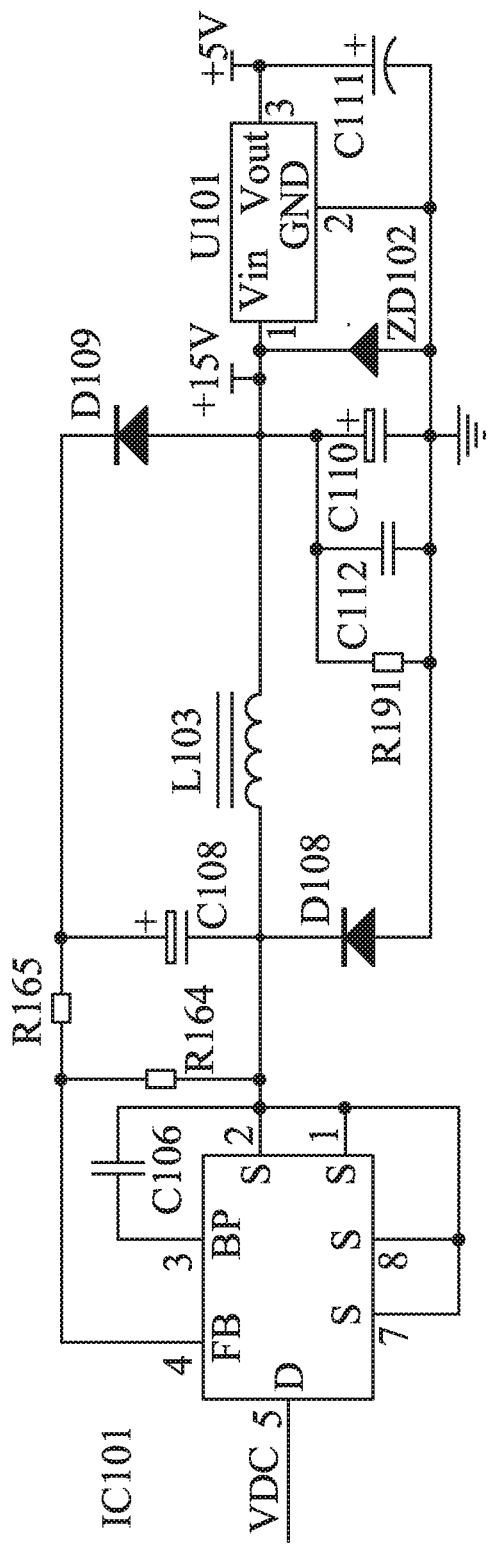
FIG. 5 is another circuit diagram corresponding to FIG. 3.

As shown in FIGS. 3-5, the power module comprises a surge current suppression circuit, an electromagnetic interference (EMI) circuit, a rectifier circuit, and a DC-DC converter circuit; an input end of the surge current suppression circuit is connected to an AC input; the surge current suppression circuit, the EMI circuit, the rectifier circuit and the DC-DC converter circuit are connected sequentially; the output end of the rectifier circuit outputs a DC bus voltage VDC; and the output end of the DC-DC converter circuit outputs a plurality of isolated independent power supplies for each circuit unit. The rectifier circuit is a rectifier comprising a voltage doubling circuit which is adapted to double the DC bus voltage VDC. The power module outputs a DC bus voltage VDC, a driving voltage VCC1 (generally +15V), and a supply voltage VCC2 (generally +5V) of the microprocessor module. As shown in FIG. 4, the power module comprises a surge current suppression circuit, an electromagnetic interference (EMI) circuit, and a rectifier circuit. The surge current suppression circuit comprises a first varistor V1, a second varistor V2, a third varistor V3, and a gas discharge tube TB. The EMI circuit comprises capacitors C1, C4, C5, C6, and inductors L1, L2. The rectifier circuit is a rectifier DB. The voltage doubling circuit comprises capacitors C11, C10, resistors R8, R9, R10, R11, and a connector JK. FIG. 5 shows a DC-DC converter circuit comprising a first chip IC 101, a second chip U101 and peripheral circuits.

Figure 6A:
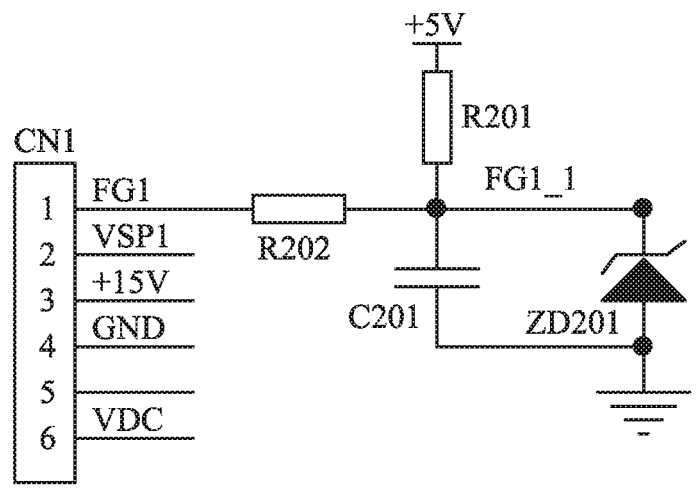
FIGS. 6A-6B are circuit diagrams of a first interface module of a conversion circuit board in accordance to one embodiment of the disclosure.
Figure 6B:
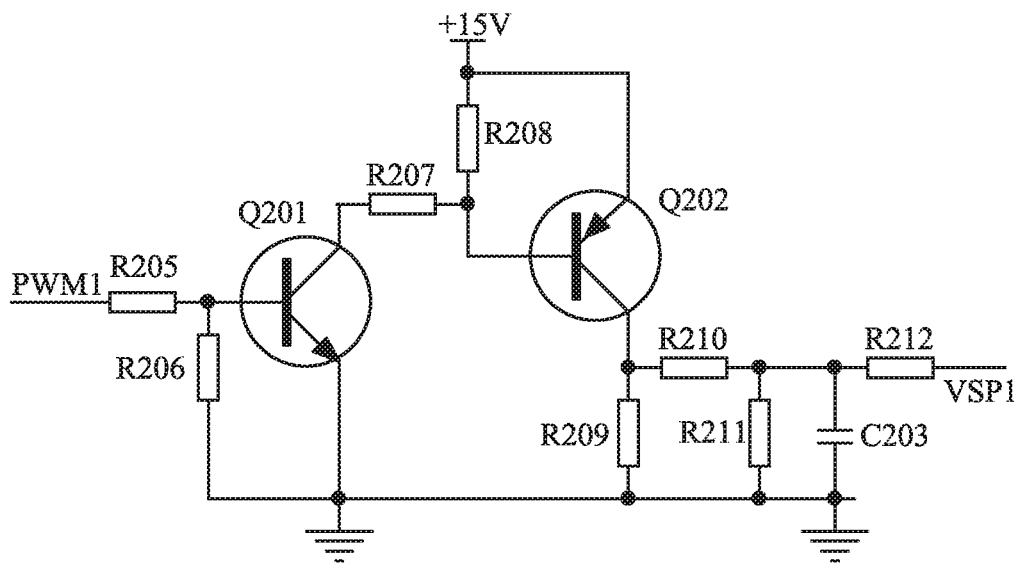
Figure 7A:
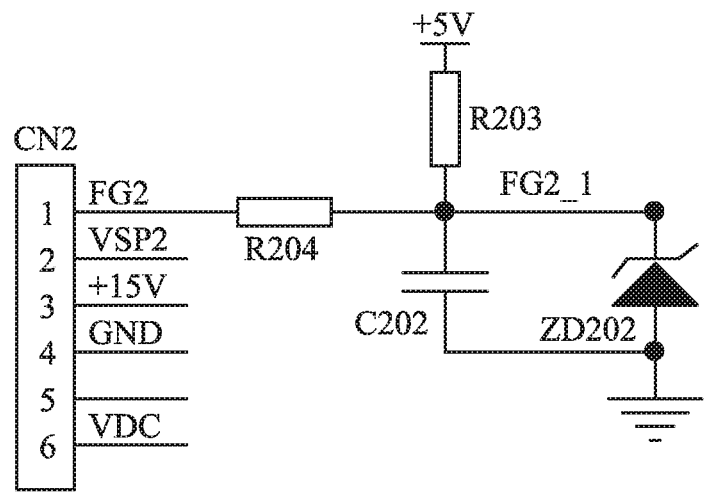
FIGS. 7A-7B are circuit diagrams of a second interface module of a conversion circuit board in accordance to one embodiment of the disclosure.
Figure 7B:
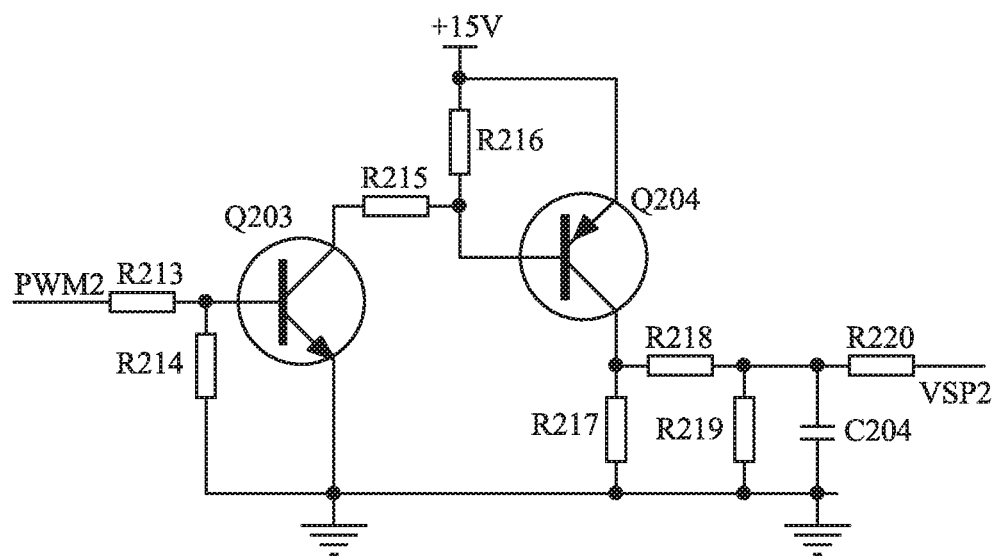

As shown in FIGS. 6A-6B, the first interface module comprises five signals: DC bus voltage VDC, grounding signal GND, driving voltage VCC1 of an insulated-gate bipolar transistor (IGBT), a first speed command signal VSP1, and a first speed feedback signal FG1. The conversion circuit board comprises two standard 6-pin communication interfaces CN1, CN2. 5 pins of one standard 6-pin communication interface CN1 are respectively connected to the DC bus voltage VDC, the grounding signal GND, the driving voltage VCC1 (+15 V) of an insulated-gate bipolar transistor (IGBT), the first speed command signal VSP1, and the first speed feedback signal FG1, and one pin is stand-by. In FIGS. 6A-6B, the PWM1 is connected to the output end of the microprocessor module. The output end of the microprocessor module is connected to an amplifying circuit comprising triodes Q201, Q202 and outputs the first speed command signal VSP1. As shown in FIGS. 7A-7B, the second interface module comprises five signals: DC bus voltage VDC, grounding signal GND, driving voltage VCC1 of an insulated-gate bipolar transistor (IGBT), a second speed command signal VSP2, and a second speed feedback signal FG2. 5 pins of the other standard 6-pin communication interface CN2 are respectively connected to the DC bus voltage VDC, the grounding signal GND, the driving voltage VCC1 (+15 V) of an insulated-gate bipolar transistor (IGBT), the second speed command signal VSP2, and the second speed feedback signal FG2, and one pin is stand-by. In FIGS. 7A-7B, the PWM2 is connected to the output end of the microprocessor module. The output end of the microprocessor module is connected to an amplifying circuit comprising triodes Q203, Q204 and outputs the second speed command signal VSP2.

Figure 8A:
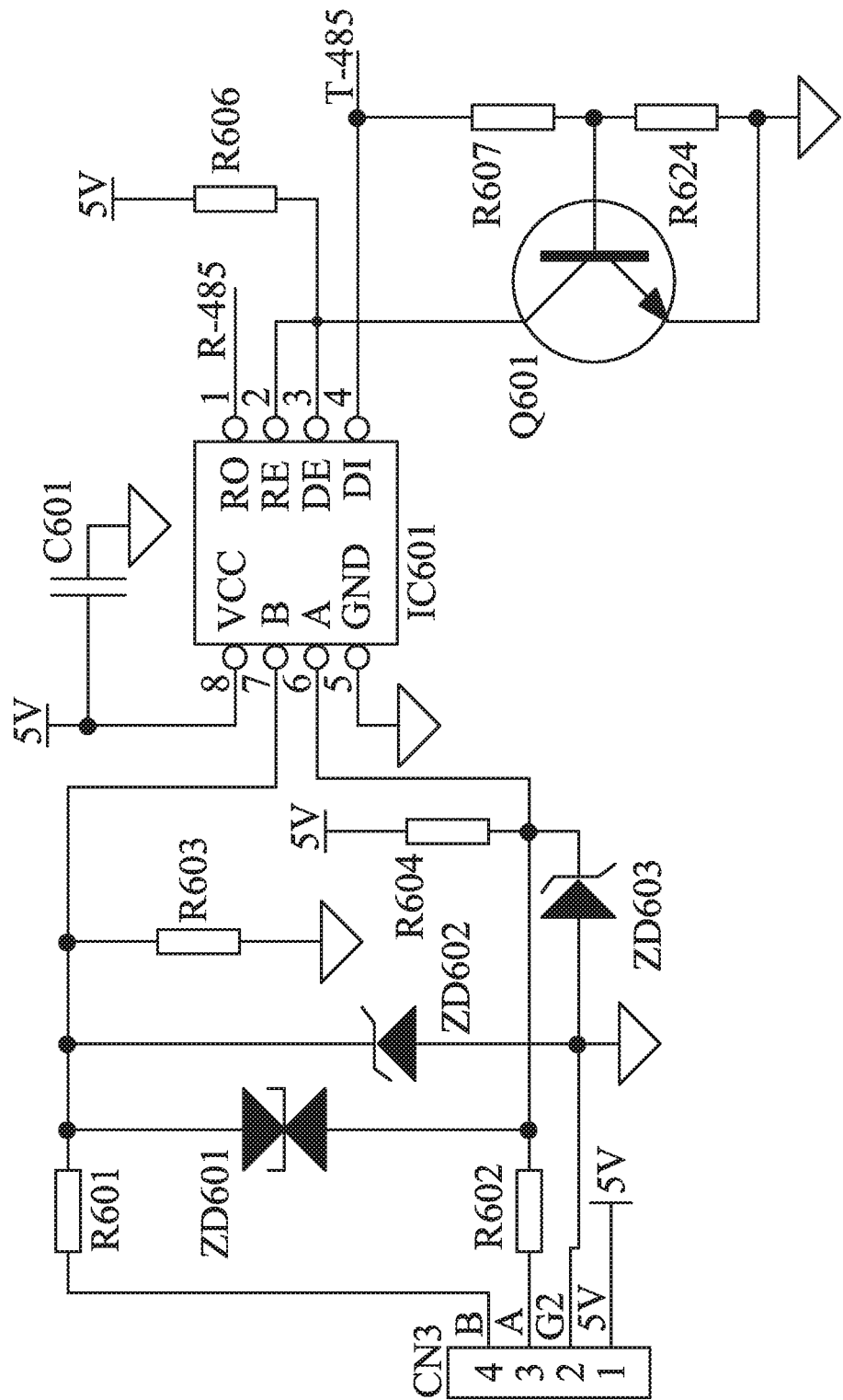
FIGS. 8A-8C are circuit diagrams of a communication module of a conversion circuit board in accordance to one embodiment of the disclosure.
Figure 8B:
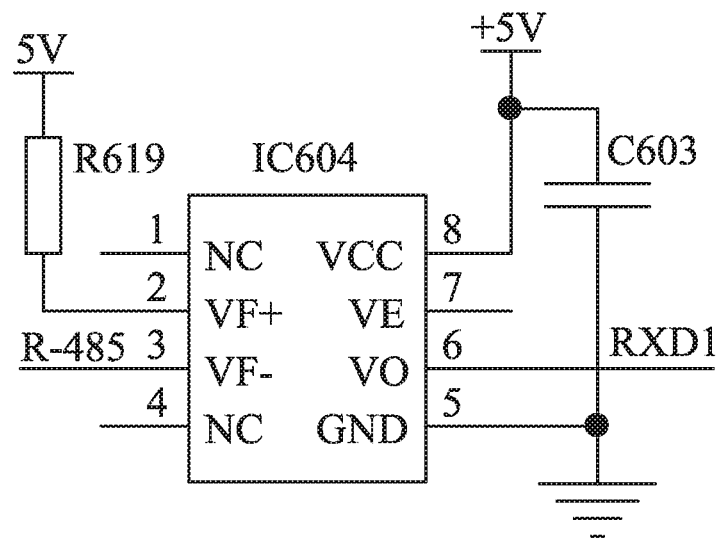
Figure 8C:
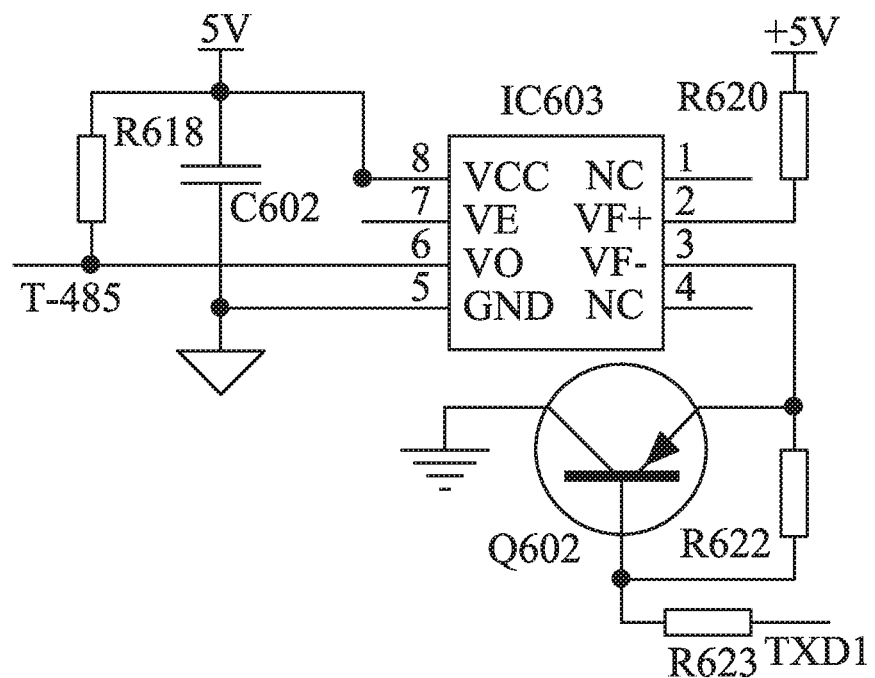

As shown in FIGS. 8A-8C, the communication module is a RS485 serial communication module. The conversion circuit board comprises a four-pin full duplex communication interface CN3, two pins of which are connected to the communication module, and the other two pins are connected to the grounding signal GND and a power supply VCC2 (+5 V), respectively.

Figure 9A:
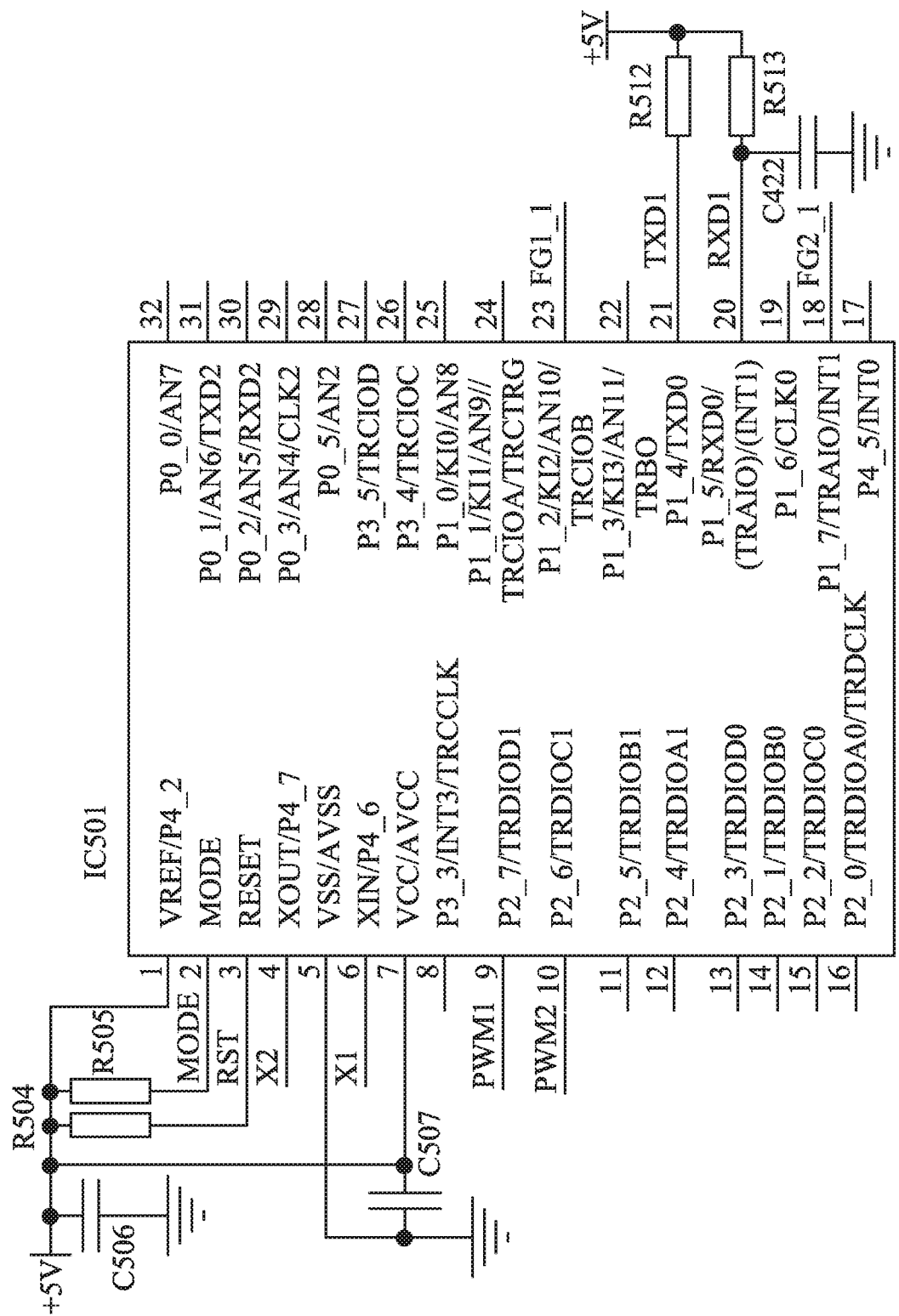
FIGS. 9A-9C are circuit diagrams of a microprocessor module of a conversion circuit board in accordance to one embodiment of the disclosure.
Figure 9B:
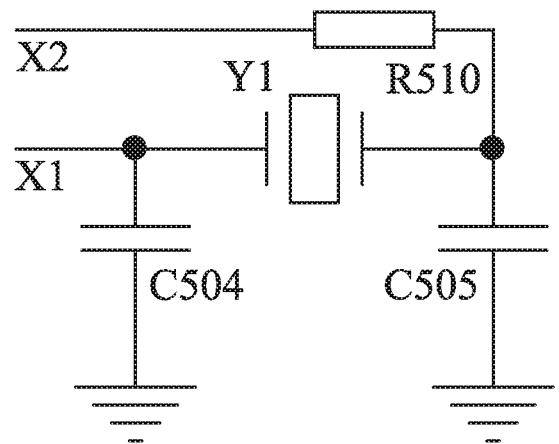
Figure 9C:
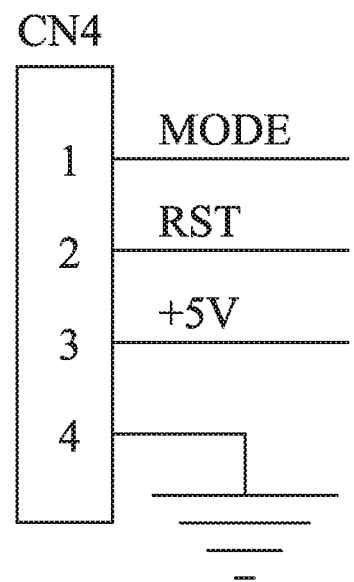
Figure 10:
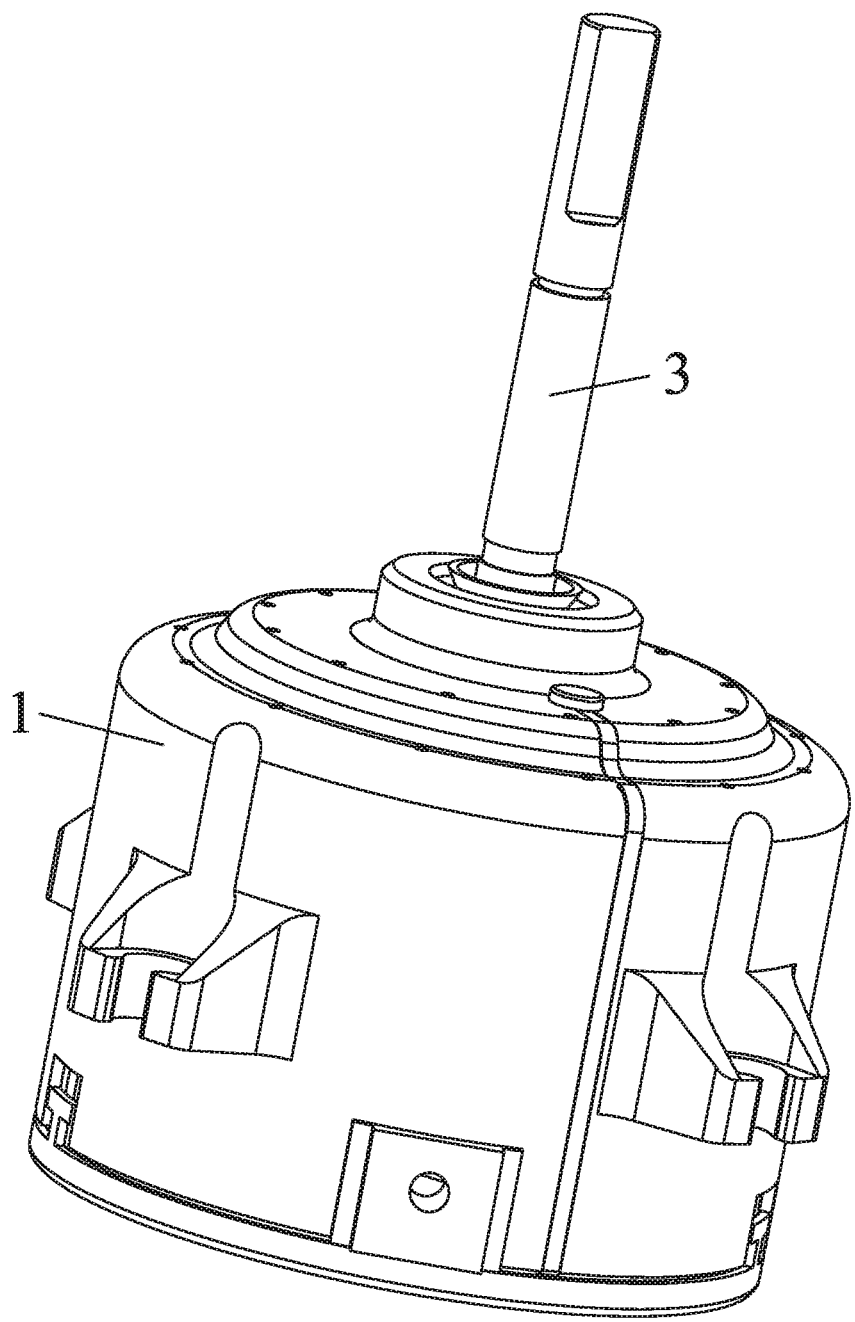
FIG. 10 is a stereogram of a BLDC motor as described in the disclosure.
Figure 11:
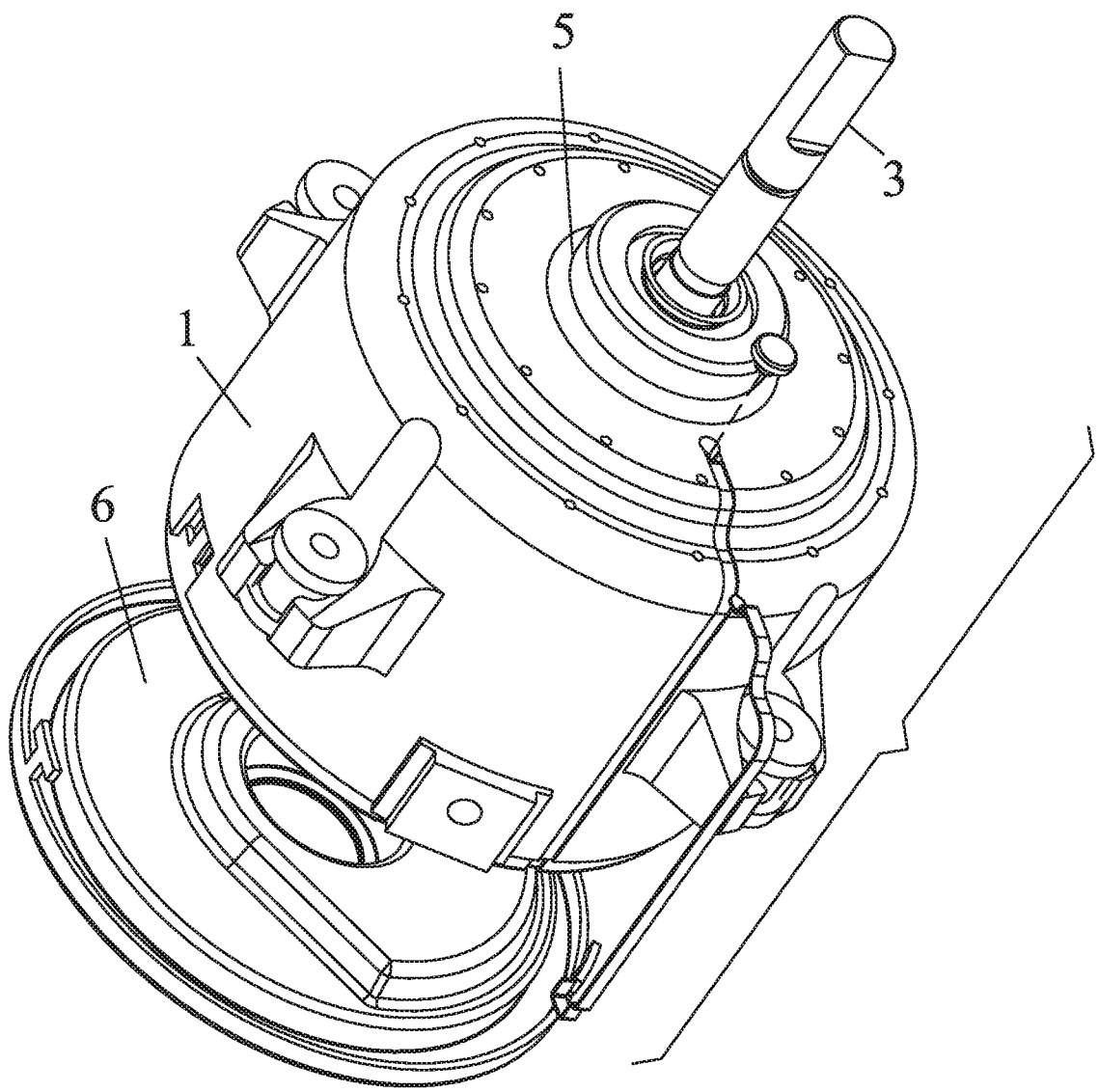
FIG. 11 is an exploded view of a BLDC motor as described in the disclosure.
Figure 12:
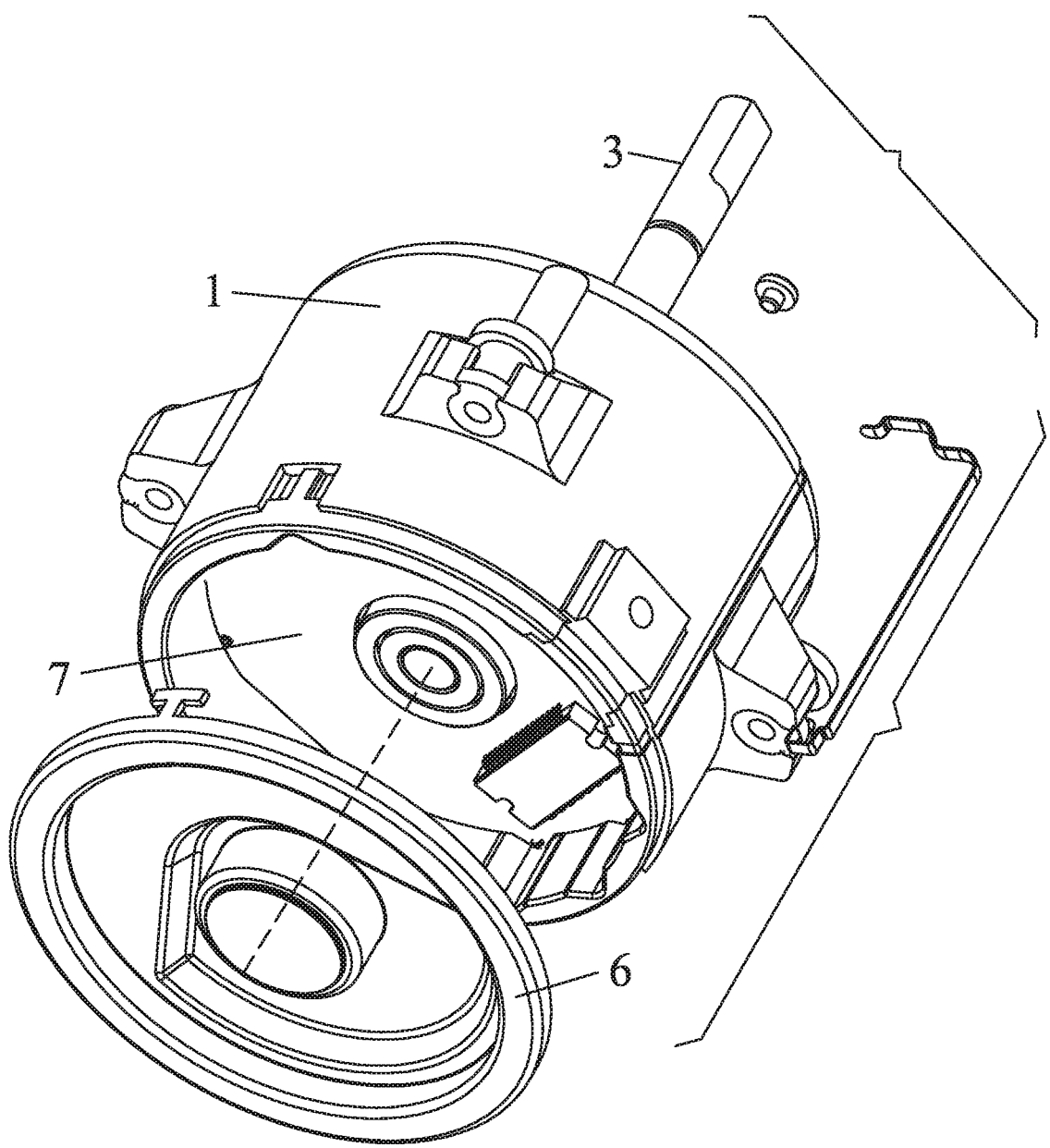
FIG. 12 is another exploded view of a BLDC motor as described in the disclosure.
Figure 13:
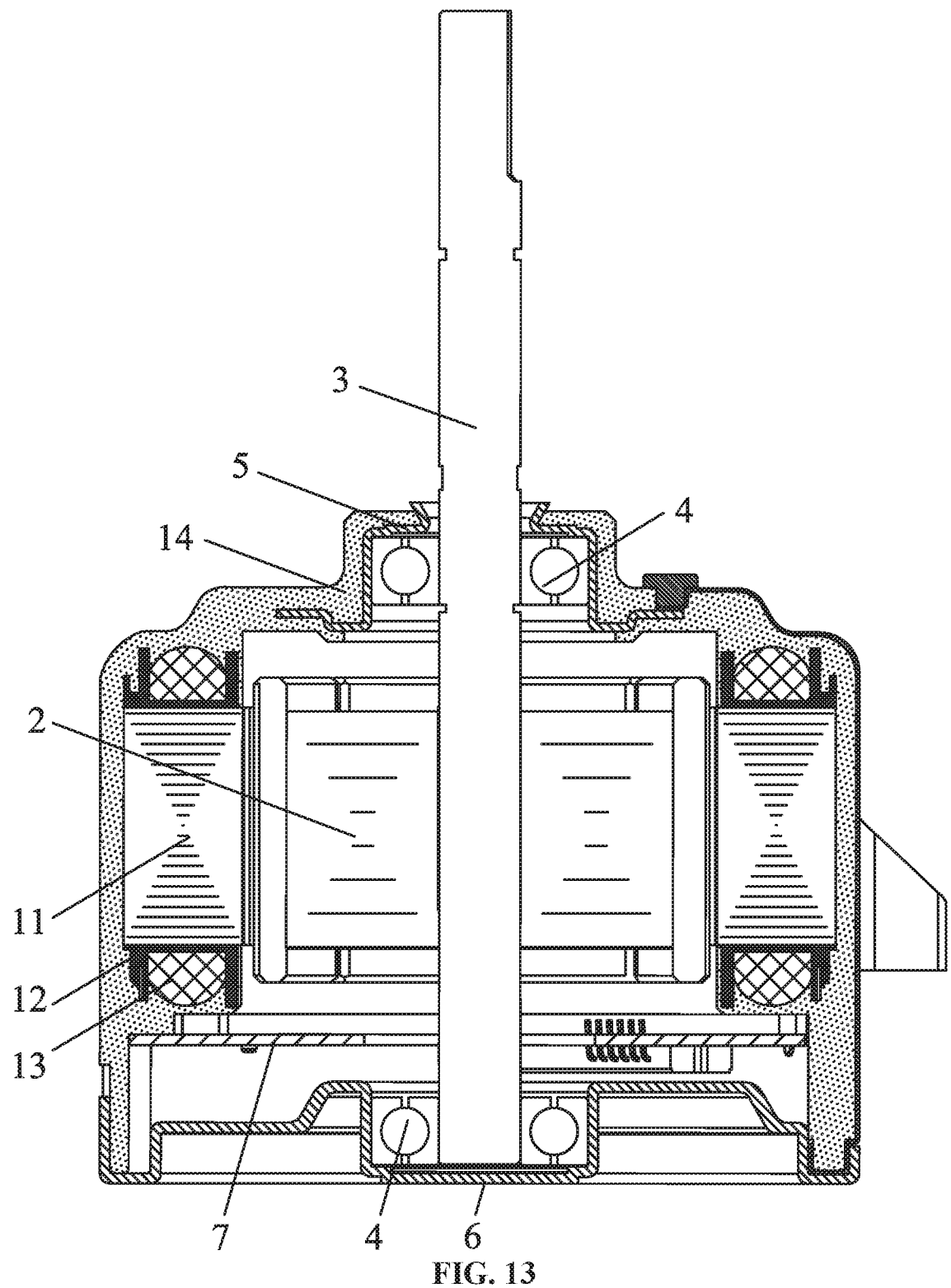
FIG. 13 is a sectional view of a BLDC motor as described in the disclosure.

As shown in FIGS. 9A-9C, the microprocessor module comprises two signal outputs PWM1 and PWM2, which are amplified to form the first speed command signal VSP1 and the second speed command signal VSP2, respectively, and output. The microprocessor module comprises two signal inputs FG1.1 and FG1.2, corresponding to the first speed feedback signal FG1 and the second speed feedback signal FG2, respectively. The microprocessor module comprises two signals TXD1 and RXD1 connected to a serial communication module.

The first speed feedback signal FG1 and the second speed feedback signal FG2 are pulse signals. The microprocessor module is adapted to convert the pulse number of the first speed feedback signal FG1 and the second speed feedback signal FG2 into a real-time rotational speed of the first brushless direct current motor and the second brushless direct current motor. The speed command signal VSP1 and the second speed command signal VSP2 are a pulse-width modulation (PWM) signal.

The microprocessor module is connected to the first brushless direct current motor and the second brushless direct current motor via the first interface module and the second interface module, respectively. The microprocessor module is adapted to convert the rotational speed command of the PTAC motherboard into the first speed command signal VSP1 of the first brushless direct current motor and the second speed command signal VSP2 of the second brushless direct current motor. The microprocessor module is adapted to convert and transmit the first speed feedback signal FG1 of the first brushless direct current motor to the PTAC motherboard, and convert and transmit the second speed feedback signal FG2 of the second brushless direct current motor to the PTAC motherboard.

As shown in FIGS. 10-13, the first brushless direct current motor and the second brushless direct current motor are a plastic encapsulated motor, which comprises a stator assembly 1, a rotor assembly 2, a rotary shaft 3, a bearing 4, a front bearing support 5, a rear bearing support 6, and a drive circuit board 7. The stator assembly 1 is a plastic encapsulated stator assembly comprising a stator core 11, an end insulator 12, a coil winding 13 and a plastic package 14. The stator core 11, the end insulator 12, and the coil winding 13 are integrated with the plastic package 14; the front bearing support 5 and the rear bearing support 6 are disposed at two ends of the plastic encapsulated stator assembly 1, respectively; two bearings 4 are provided and disposed on the front bearing support 5 and the rear bearing support 6, respectively; the rotary shaft 4 is supported by the two bearings 4; and the rotor assembly 2 is connected to the rotary shaft 3.

Figure 14:
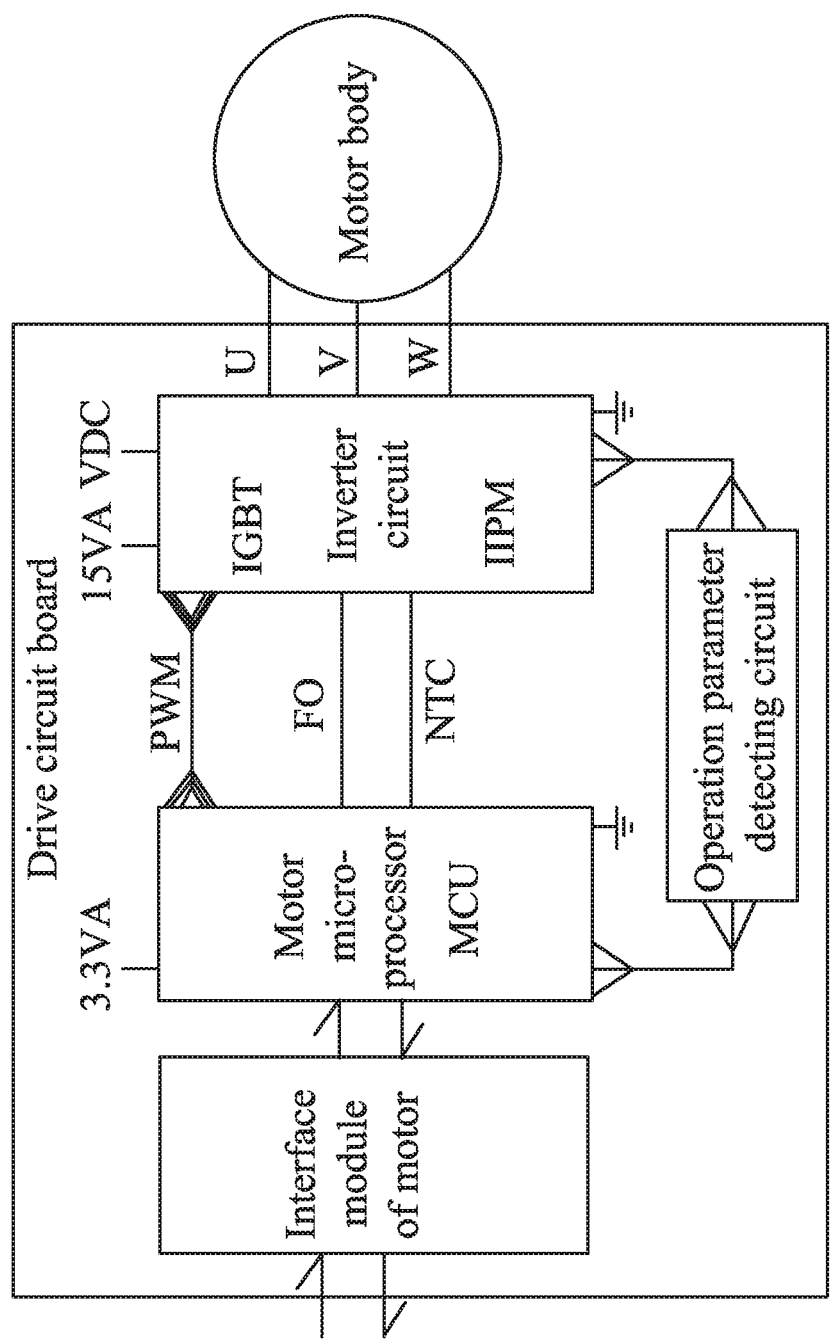
FIG. 14 is a block diagram of a driving circuit board of a BLDC motor as described in the disclosure.
Figure 15:
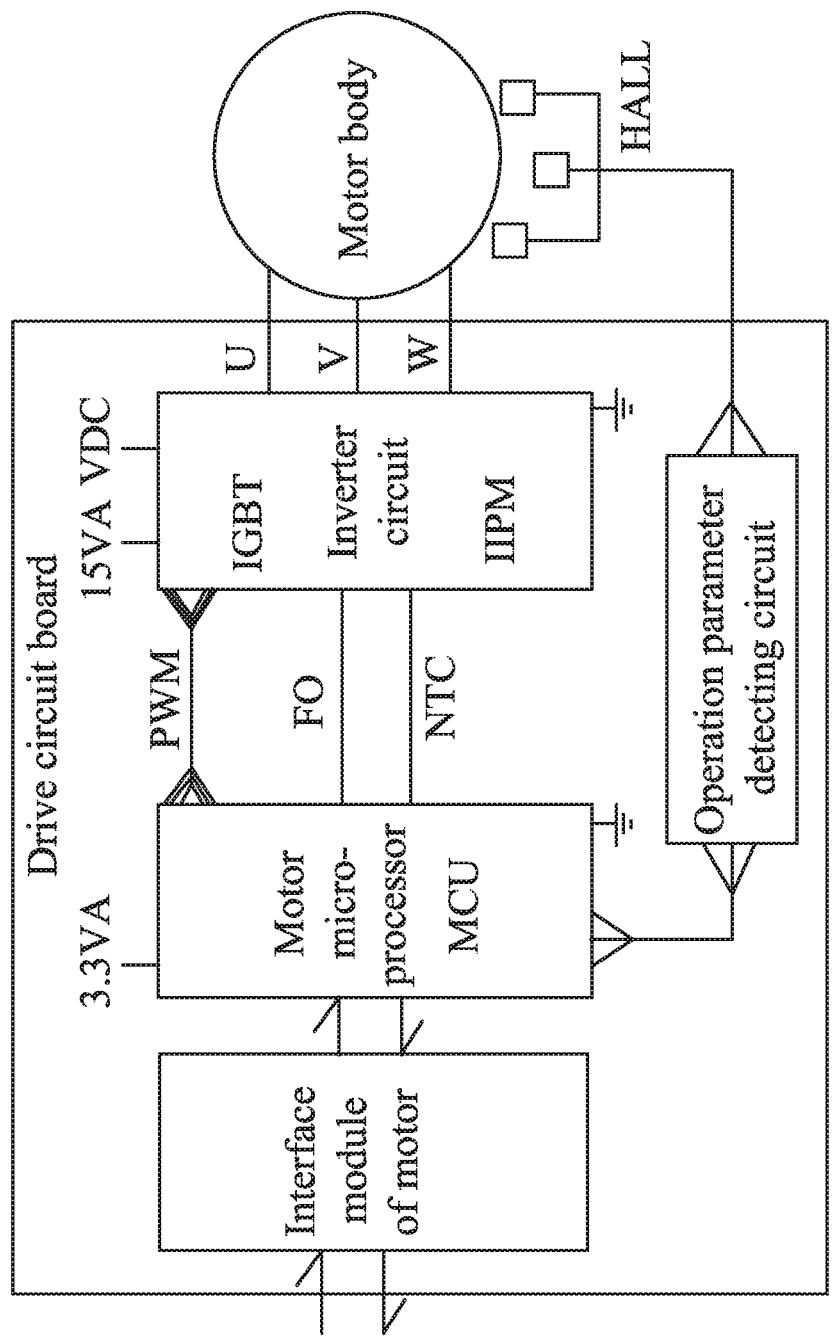
FIG. 15 is another block diagram of a driving circuit board of a BLDC motor as described in the disclosure.

The first BLDC motor and the second BLDC motor as shown in FIG. 2 each comprises a motor body equipped with a drive circuit board. The motor body comprises a stator assembly 1, a rotor assembly 2, a rotary shaft 3 and a bearing 4; the drive circuit board 7 comprises a built-in interface circuit, a motor microprocessor, a detection circuit of motor operation parameters, and an IGBT inverter circuit; the detection circuit is adapted to transmit the detected motor operation parameters to the motor microprocessor; the motor microprocessor outputs a control signal to the IGBT inverter circuit, and the IGBT inverter circuit controls the power on or off of the coil winding of the stator assembly. The detection circuit of motor operation parameters can detect the phase current of each phase winding of the motor, as shown in FIG. 14, and the IGBT inverter circuit adopts an intelligent power integrated chip IPM. The detection circuit of motor operation parameters can also detect the position signal of the rotor assembly, as shown in FIG. 15. The rotor position is detected by a HALL element. As shown in FIG. 14, the detection circuit of motor operation parameters is used to detect bus current signal and bus voltage signal.

It will be obvious to those skilled in the art that changes and modifications may be made, and therefore, the aim in the appended claims is to cover all such changes and modifications.

What is claimed is:

1. A conversion circuit board in an air conditioner, comprising:
    a microprocessor module;
    a power module;
    a communication module;
    a first interface module; and
    a second interface module;
   wherein:
    the microprocessor module is adapted to communicate with a motherboard of the air conditioner via the communication module;
    the microprocessor module is adapted to connect to a first brushless direct current motor and a second brushless direct current motor via the first interface module and the second interface module, respectively;
    the power module supplies powers for the microprocessor module, the communication module, the first interface module, and the second interface module;
    the first interface module and the second interface module each comprises five signals: a DC bus voltage, a grounding signal, a driving voltage of an insulated-gate bipolar transistor (IGBT), a speed command signal, and a speed feedback signal; and
    the speed feedback signal is a pulse signal; the microprocessor module is adapted to convert a pulse number of the speed feedback signal into a real-time rotational speed of the first and/or second brushless direct current motor.

2. The circuit board of claim 1, wherein
    the power module comprises a surge current suppression circuit, an electromagnetic interference (EMI) circuit, a rectifier circuit, and a DC-DC converter circuit;
    an input end of the surge current suppression circuit is connected to an AC input;

the surge current suppression circuit, the EMI circuit, the rectifier circuit and the DC-DC converter circuit are connected sequentially;

an output end of the rectifier circuit outputs a DC bus voltage; and an output end of the DC-DC converter circuit outputs a plurality of isolated independent power supplies.

3. The circuit board of claim 2, wherein the rectifier circuit is a rectifier comprising a voltage doubling circuit which is adapted to double the DC bus voltage.

4. The circuit board of claim 1, wherein the communication module is a serial communication module.

5. The circuit board of claim 1, wherein the speed command signal is a pulse-width modulation (PWM) signal.

6. The circuit board of claim 5, wherein the communication module is a RS485 serial communication module.

7. An air conditioner, comprising:
the conversion circuit board of claim 1;
the motherboard;
a first brushless direct current motor; and
a second brushless direct current motor;
wherein:
the microprocessor module communicates with the motherboard via the communication module;
the microprocessor module is connected to the first brushless direct current motor and the second brushless direct current motor via the first interface module and the second interface module, respectively;
the microprocessor module is adapted to convert a rotational speed command of the motherboard into a speed command signal of the first and/or the second brushless direct current motor; and
the microprocessor module is adapted to convert and transmit a speed feedback signal of the first and/or the second brushless direct current motor to the motherboard.

8. The air conditioner of claim 7, wherein
the first brushless direct current motor and the second brushless direct current motor each comprises a motor body equipped with a drive circuit board;
the motor body comprises a stator assembly, a rotor assembly, a rotary shaft, and a bearing;
the drive circuit board comprises a built-in interface circuit, a motor microprocessor, a detection circuit of motor operation parameters, and an IGBT inverter circuit; and
the detection circuit is adapted to transmit detected motor operation parameters to the motor microprocessor, the motor microprocessor outputs a control signal to the IGBT inverter circuit, and the IGBT inverter circuit controls the power on or off of the stator assembly.

9. The air conditioner of claim 8, wherein
the first brushless direct current motor and the second brushless direct current motor are a plastic encapsulated motor and each further comprises a front bearing support and a rear bearing support;
the stator assembly is a plastic encapsulated stator assembly comprising a stator core, an end insulator, a coil winding and a plastic package;
the stator core, the end insulator, and the coil winding are integrated with the plastic package;
the front bearing support and the rear bearing support are disposed at two ends of the plastic encapsulated stator assembly, respectively;
two bearings are provided and disposed on the front bearing support and the rear bearing support, respectively;
the rotary shaft is supported by the two bearings; and
the rotor assembly is connected to the rotary shaft.

10. The air conditioner of claim 9, wherein the detection circuit of motor operation parameters is adapted to detect a rotor position signal or a phase current signal of the coil winding or a bus current signal and a bus voltage signal.

11. The air conditioner of claim 9, wherein the conversion circuit board comprises a four-pin full duplex communication interface, two pins of which are connected to the communication module, and the other two pins are connected to a grounding signal and a supply voltage of the microprocessor module, respectively.

12. The air conditioner of claim 9, wherein
the conversion circuit board comprises two standard 6-pin communication interfaces;
5 pins of one standard 6-pin communication interface are respectively connected to a DC bus voltage, grounding signal, a driving voltage of an insulated-gate bipolar transistor (IGBT), a first speed command signal, and a first speed feedback signal; and one pin is stand-by; and
5 pins of the other standard 6-pin communication interface are respectively connected to the DC bus voltage, the grounding signal, the driving voltage of the insulated-gate bipolar transistor (IGBT), a second speed command signal, and a second speed feedback signal; and one pin is stand-by.

* * * * *